United States Patent
Kolde et al.

(10) Patent No.: US 6,762,773 B2
(45) Date of Patent: Jul. 13, 2004

(54) SYSTEM AND METHOD FOR PROVIDING A CONTEXT-SENSITIVE INSTRUCTIONAL USER INTERFACE ICON IN AN INTERACTIVE TELEVISION SYSTEM

(75) Inventors: Hubert E. Kolde, Mercer Island, WA (US); Anthony F. Istvan, Snoqualmie, WA (US)

(73) Assignee: Digeo, Inc., Kirkland, WA (US)

( * ) Notice: Subject to any disclaimer, the term of this patent is extended or adjusted under 35 U.S.C. 154(b) by 368 days.

(21) Appl. No.: 09/863,896

(22) Filed: May 23, 2001

(65) Prior Publication Data

US 2002/0175944 A1 Nov. 28, 2002

(51) Int. Cl.$^7$ ............................................... G06F 15/00
(52) U.S. Cl. ..................................... 345/716; 725/131
(58) Field of Search ................................. 345/423, 716, 345/744, 747, 765, 810, 821, 822, 840; 725/131, 135, 139

(56) References Cited

U.S. PATENT DOCUMENTS

| | | | |
|---|---|---|---|
| 5,280,572 A | 1/1994 | Case et al. | |
| 5,648,824 A | 7/1997 | Dunn et al. | |
| 6,064,385 A | 5/2000 | Sturgeon et al. | |
| 6,141,002 A | 10/2000 | Kanungo et al. | |
| 6,375,043 B1 * | 4/2002 | LeBlanc | 725/61 |
| 6,529,233 B1 * | 3/2003 | Allen | 348/376 |
| 6,600,503 B2 * | 7/2003 | Stautner et al. | 345/854 |

* cited by examiner

*Primary Examiner*—Cao Nguyen
(74) *Attorney, Agent, or Firm*—Kory D. Christensen; Stoel Rives LLP (57) ABSTRACT

Icons representing a plurality of interactive options periodically available within an interactive television system are stored in an icon repository. Each interactive option corresponds to a button on a remote control. Furthermore, each icon shares a common visual characteristic with a corresponding button on the remote control. Exemplary shared visual characteristics include shape, color, size, relative position, etc. In response to an interactive option corresponding to a first icon becoming available, the first icon is displayed on a television to alert the user to the interactive option. The first icon may be visually emphasized in various ways, such as by highlighting, animation, and scaling.

46 Claims, 9 Drawing Sheets

FIG. 9

SYSTEM AND METHOD FOR PROVIDING A CONTEXT-SENSITIVE INSTRUCTIONAL USER INTERFACE ICON IN AN INTERACTIVE TELEVISION SYSTEM

BACKGROUND OF THE INVENTION

1. Field of the Invention

The present invention relates generally to the field of interactive television systems. More specifically, the present invention relates to a system and method for providing a context-sensitive instructional user interface icon in an interactive television system.

2. Description of Related Background Art

Television and Internet technologies are beginning to converge. In particular, access to the World Wide Web using Internet-enabled television systems is becoming increasingly popular. Internet-enabled television systems, also referred to as "interactive" television systems, enable users to enjoy new levels of interactivity that were impossible only a few years ago. Internet-enabled television systems bring the power of the Internet to a large segment of users who were previously deterred by the complexities of modern personal computers.

Conventional televisions have been available for many years. As such, most people are familiar with the features and operation of a conventional television. Moreover, remote controls for conventional televisions are relatively uniform, allowing users to switch between brands with little or no difficulty.

By contrast, interactive television systems are new. Remote control designs vary widely between manufacturers. Moreover, due to the number and variety of interactive options typically available in an interactive television system, remote control designs are often quite complex. For example, remote controls for an interactive television system may have fifty or more buttons for activating various interactive options. Examples of interactive option include the ability to make online purchases while watching advertisements for various products, checking e-mail while watching television, participating in opinion polls, etc.

Such complexity is appealing to advanced users, but daunting to novice users. In many cases, novice users will pass on available interactive options because of their inability to locate the correct button on the remote control. Printed manuals and on-line help functions are generally not satisfactory, since certain interactive options are only available for a brief period of time, too brief for a user to consult a manual or the like. Moreover, requiring constant reference to a manual may annoy a user to the point of ignoring interactive options altogether.

Accordingly, what is needed is a system and method for providing a context-sensitive instructional user interface icon in an interactive television system. What is also needed is a system and method for providing a context-sensitive instructional user interface icon that intuitively assists a user in identifying and locating a button on a remote control corresponding to an available interactive option. What is also needed is a system and method for providing a context-sensitive instructional user interface icon that relies on a plurality of visual characteristics to instruct the user as to which button on a remote control will activate a currently-available interactive option. Additionally, what is needed is a system and method for providing a context-sensitive instructional user interface icon that is non-intrusive to a user's operation of an interactive television system.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the foregoing problems and disadvantages with a system and method for providing a context-sensitive instructional user interface icon in an interactive television system. In one embodiment, an icon for each of a number of interactive options periodically available within an interactive television system is stored within an icon repository. Each interactive option corresponds to a button on a remote control. Furthermore, each icon shares a common visual characteristic with a corresponding button on the remote control. Examples of shared visual characteristics include shape, color, text markings, graphical markings, size, relative position, or a combination thereof.

In response to an interactive option becoming available, a icon corresponding to the interactive option is displayed. To bring the icon to the attention of a user, the icon may be visually emphasized through animation, highlighting, scaling, or the like. Since the icon and the corresponding button share one or more common visual characteristics, a user may quickly and easily identify the button of the remote control corresponding to the available interactive option.

In one implementation, the instructional user interface icon is displayed with other icons in the context of a map of the remote control. The location of each icon in the map corresponds to the relative location of a button on the remote control. The instructional user interface icon may be highlighted, animated, or otherwise differentiated from the other icons in order for the user to be able to easily locate the corresponding button on the remote control.

As used herein, the term "remote control" is not limited to conventional remote controls. Rather, the term contemplates a variety of devices that enable a user to operate an interactive television system. Remote controls may include, for example, webpads, personal desktop assistants (PDAs), wired or wireless keyboards, and the like.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Throughout the following disclosure, the term "coupled" may be used to refer to components that are either directly connected or are linked by one or more other components. Thus, as used herein, the term "coupled" may be synonymous with "in electrical communication with" or simply "in communication with."

Figure 1:
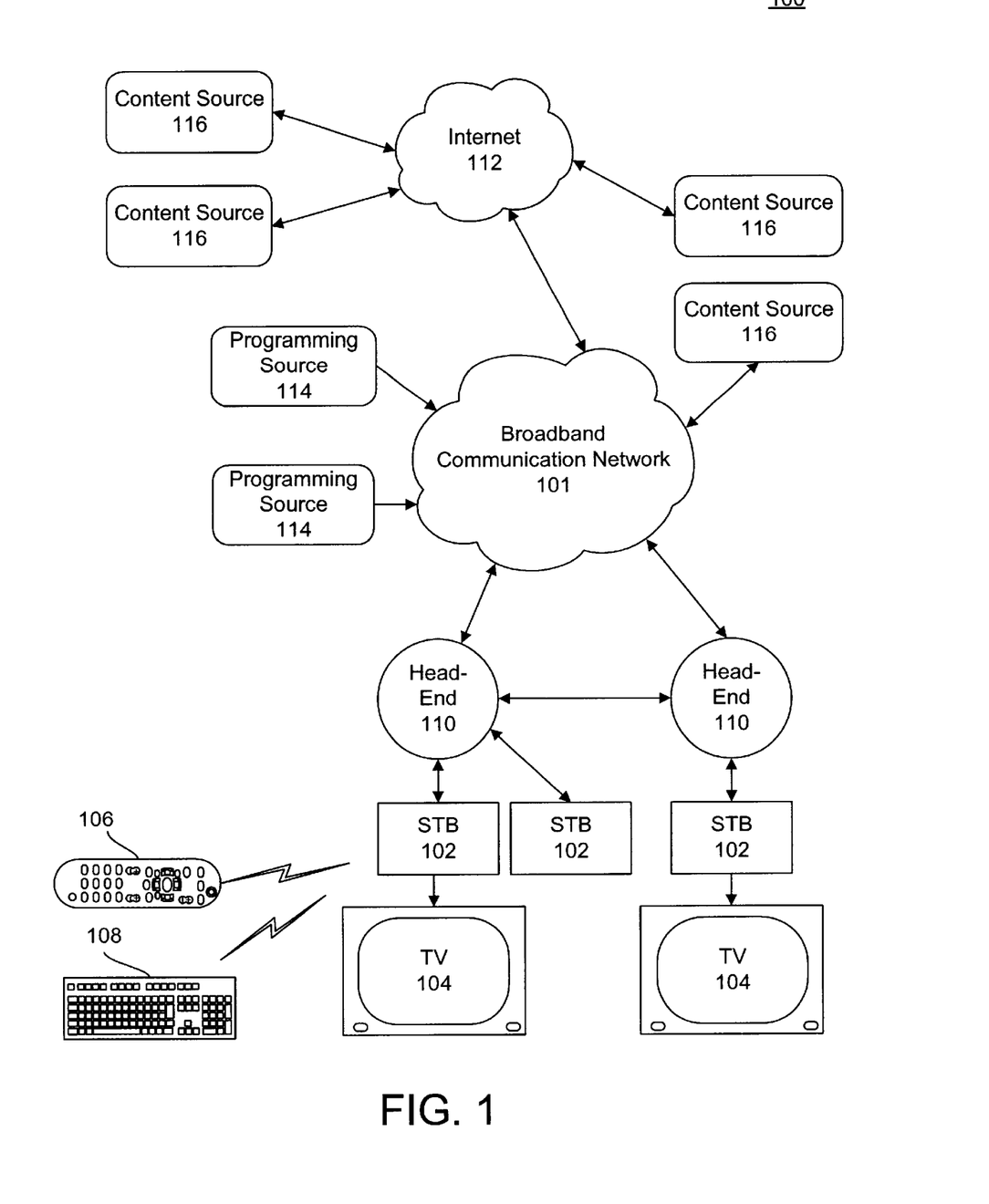
FIG. 1 is a block diagram of a system for delivering television programs and other forms of content.

Referring now to FIG. 1, there is shown a system 100 for delivering television programs and other forms of content to a plurality of customers. In one implementation, the system 100 relies on a broadband communication network 101, such as a cable network. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television 104 and the network 101. In alternative embodiments, an STB 102 may be embodied more generally as a personal computer, an advanced television 104 including STB functionality, or another type of client terminal.

An STB 102 receives encoded television signals and other information from the network 101 and decodes the same for display on the television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote controls are also contemplated, such as a wired or wireless mouse (not shown).

Additionally, a keyboard 108 (either wireless or wired) is provided, in one embodiment, to allow the customer to rapidly enter text information into the STB 102. Such text information may be used for e-mail or instant messaging, e.g. text-based chat. In various embodiments, the keyboard 108 may use infrared (IR), radio frequency (RF), or other wireless technologies to transmit keystrokes to the STB 102.

In one embodiment, each STB 102 is coupled to the network 101 via a head-end 110 or other distribution node. In the context of a cable network, a head-end 110 is generally a centrally-located facility where television programs are received from a local cable TV satellite downlink or other source and packaged together for transmission to customer homes. In one configuration, a head-end 110 also functions as a Central Office (CO) in the telephone industry, routing video streams and other data to and from the various STBs 102 serviced thereby. Head-ends 110 may be coupled directly to one another or through the network 101. In some cases, head-ends 110 may be connected via a separate network, one particular example of which is the Internet 112.

The network 101 is preferably coupled to one or more television programming sources 114, which provide television programming for distribution to the STBs 102. In one configuration, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

The network 101 is also preferably coupled to the Internet 112 to provide access thereto by the STBs 102. The Internet 112 is a "network of networks" and is well known to those skilled in the art. Communication over the Internet 112 is accomplished using standard protocols, such as TCP/IP (Transmission Control Protocol/Internet protocol) and the like.

In one embodiment, the Internet 112 is coupled to one or more content sources 116. A content source 116 provides access to various forms of content, such as Web pages, streaming media (audio and/or video), databases, commercial transactions, and the like. For example, a content source 116 may include a commercial e-commerce site, such as Amazon.com®. The content sources 116 may be accessed, for example, using a Web browser integrated with an STB 102. Of course, content sources 116 may also be coupled directly to the network 101.

The system 100 is preferably capable of providing a variety of interactive options to a user. In one embodiment, an interactive option is a feature of the system 100 that allows a user to interact with a content source 116 while watching programming received from a programming source 114, accessing another content source 116, or the like.

For example, one interactive option may allow a user to participate in an opinion poll while watching a presidential debate. Another interactive option may allow a user to purchase an item being currently advertised or displayed. Still another interactive option may allow a user to check his or her e-mail in response to a notification that a new e-mail message has arrived. Yet another interactive option may allow a user to establish a two-way communication channel with a technical support person or a sales representative. The possible interactive options available using the system 100 are endless.

Interactive options may be implemented using various techniques, protocols, and standards. For example, one technique, established by the Advanced Television Enhancement Forum (ATVEF), relies on embedding "triggers" into a television broadcast. Triggers allow content developers, broadcasters, or cable operators to insert real-time prompts and user-selectable links into the video stream. Among other information, a trigger may contain a network address, such as a Universal Resource Locator (URL), that defines the location of content for the interactive option.

Figure 2:
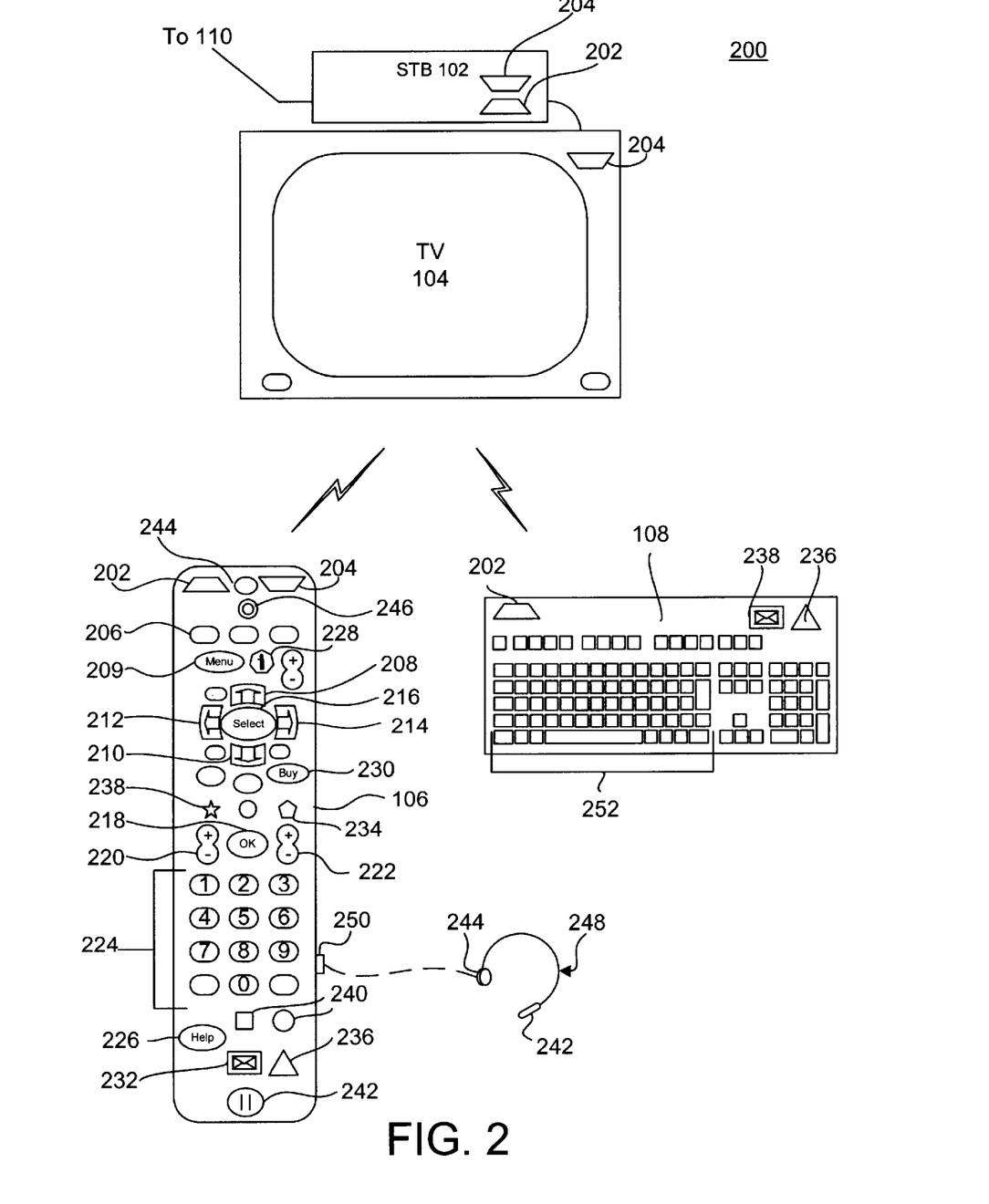
FIG. 2 is an illustration of an interactive television system including a remote control, a keyboard, a set top box, and a television.

Referring now to FIG. 2, there is shown an interactive television system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting signals to the STB 102 and the television 104. Likewise, the remote control 106 includes a wireless receiver 204 for receiving signals from the STB 102.

In one embodiment, the wireless transmitters 202 and receivers 204 are configured to use radio frequency (RF) signals. In other embodiments, infrared (IR) or other frequencies along the electromagnetic spectrum may be used. Operational details regarding the wireless transmitters 202 and receivers 204 are generally well known to those of skill in the art.

The remote control 106 preferably includes a number of buttons or other similar controls. For instance, the remote control 106 may include various standard buttons, such as a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, and the like.

Additionally, the remote control 106, in one configuration, may includes a number of buttons specifically-designated for activating various interactive options. These buttons may include, for example, a "Help" button 226, an information button 228, a "Buy" button 230, an e-mail button 232, as well as other buttons 234, 236, 238, 240 designated to activate specific interactive options.

In one embodiment, the remote control 106 includes a microphone 242 for capturing an audio signal. The captured audio signal is preferably transmitted to the STB 102 via the wireless transmitter 202. In addition, the remote control 106 may include a speaker 244 for generating audible output from an audio signal received from the STB 102 via the wireless receiver 204.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone.

In alternative embodiments, as described below, the speaker 244, the microphone 242, and/or the video camera 246 may be disposed within the STB 102, the keyboard 108, the television 104, and/or other suitable locations.

Alternatively, or in addition, a hands-free headset 248 may be coupled to the remote control 106 or keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

In certain embodiments, the remote control 106 includes a video camera 246, such as a CCD (charge-coupled device) digital video camera. The video camera 246 allows a user to capture and send video signals to the STB 102. For example, the video camera 246 may capture images of a customer's screen to aid a support technician in resolving the customer's problem. In one implementation, the video camera 246 is in electrical communication with the wireless transmitter 202 for sending the captured video signal to the STB 102.

The optional keyboard 108 facilitates rapid composition of text messages. The keyboard 108 includes a plurality of standard alphanumeric keys 252 arranged in a suitable format, such as QUERTY or DVORAC. In one configuration, the keyboard 108 includes a wireless transmitter 202, similar or identical to the wireless transmitter 202 of the remote control 106. The wireless transmitter 202 transmits keystroke data from the keyboard 108 to the STB 102. Additionally, the keyboard 108 may include one or more of the buttons illustrated on the remote control 106.

In one implementation, the buttons and audio/video components of the remote control 106 are in electrical communication with the wireless transmitter 202 and/or the wireless receiver 204 for communicating with the corresponding wireless receiver 204 and/or wireless transmitter 202 within the STB 102. Such communication may be according to the IEEE 802.11a or 802.11b Wireless Networking standards, the "Bluetooth" standard, or according to other standard or proprietary wireless techniques. The wireless transmitter 202 and wireless receiver 204 may include various additional components not specifically illustrated but well known in the art.

Figure 3:
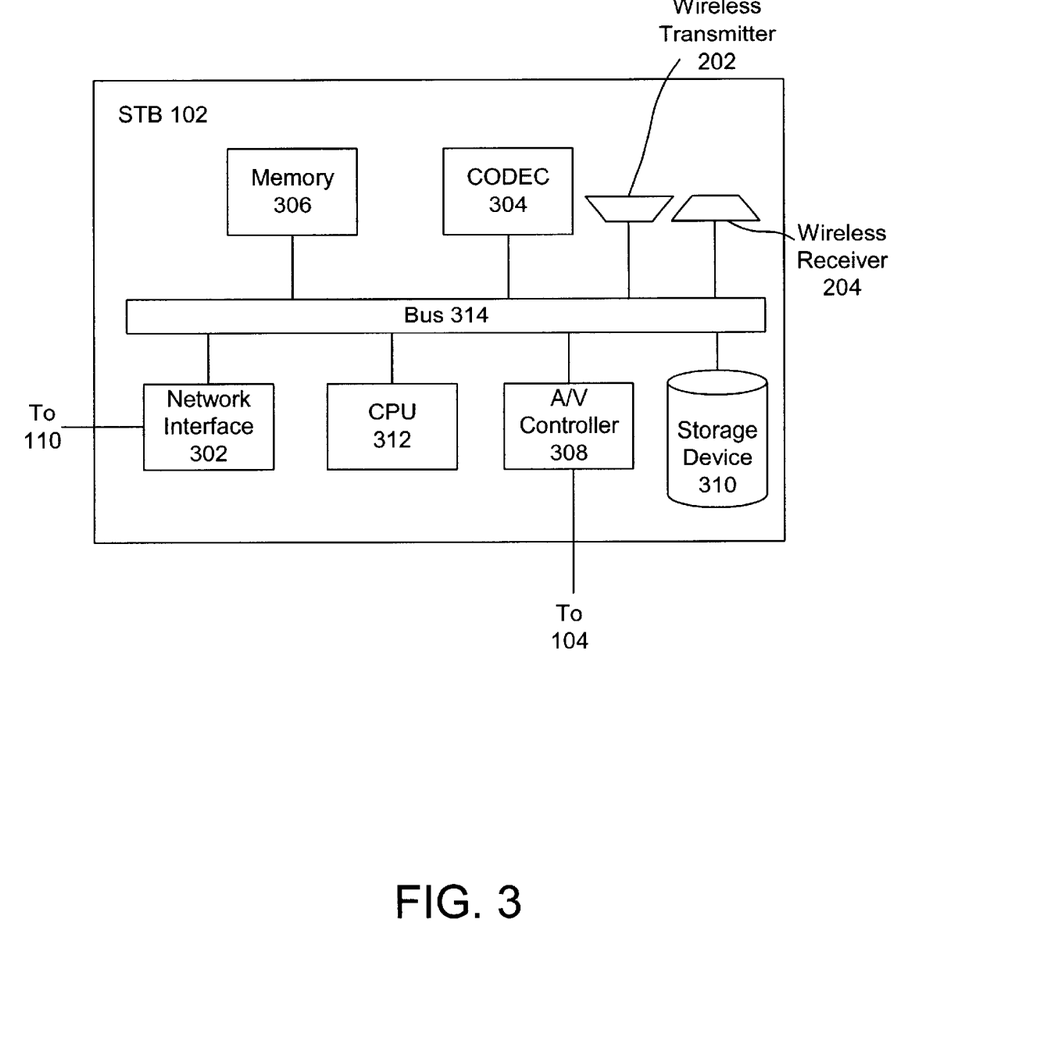
FIG. 3 is a physical block diagram of hardware components of a set top box.

Referring now to FIG. 3, there is shown a physical block diagram of an STB 102 according to an embodiment of the invention. As noted above, the STB 102 includes a wireless receiver 204 for receiving control signals and audio/video signals sent by the wireless transmitter 202 in the remote control 106.

The STB 102 also includes, in one implementation, a network interface 302 for communicating with the broadband communication network 101 via the head-end 110. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a CODEC (encoder/decoder) 304, which serves to encode signals (such as audio/video signals) into a network-compatible data stream for transmission over the network 101. The CODEC 304 also serves to decode a network-compatible data stream received from the network 101. As depicted, the CODEC 304 may be implemented as a hardware component. Alternatively, or in addition, software encoding and decoding may be used. The CODEC 304 may use various algorithms, such as MPEG or Voice over IP (VoIP), for encoding and decoding.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, an audio/video (A/V) controller 308 is provided for converting digital audio/video signals into analog signals for display/playback on the television 104 or other devices. The A/V controller 308 may be implemented using one or more physical devices, such as a separate graphics and sound hardware. In alternative embodiments, the A/V controller 308 may provide a direct, digital video output for televisions 104 or other devices equipped to receive the same. Preferably, the A/V controller 308 includes graphics hardware for performing bit-block transfers (bit-blits) and other graphical operations in order to display a graphical user interface (GUI) on the television 104.

In some implementations, the STB 102 may include a storage device 310, such as a hard disk drive or the like. The storage device 310 may be configured to record encoded television broadcasts and retrieve the broadcasts at a later time for decoding by the CODEC 304 and display by the A/V controller 308.

The storage device 310 may also be used in various embodiments to store viewer preferences, parental lock settings, electronic programming guide (EPG) data, programming preferences, passwords, e-mail messages, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP) or other device known in the art. As noted above, the CPU 312 may perform logical and arithmetic operations based upon control signals generated by the remote control 106 and transmitted to the receiver 204.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

As illustrated in FIG. 2, the devices and controls on the remote control 106 and/or keyboard 108 can be highly complicated and overwhelming, particularly to a novice user. Often, simply finding the correct button for executing a command or accessing an interactive option may be a challenge. Conventionally, the challenge may be handled by including fewer buttons on the remote control 106. However, this requires various buttons to serve multiple roles, which can be annoying to advanced users. Alternatively, help screens and printed manuals may be provided to assist novice users. However, for certain interactive options, a user may not have time to consult a help screen or printed manual before the option is no longer available.

Figure 4:
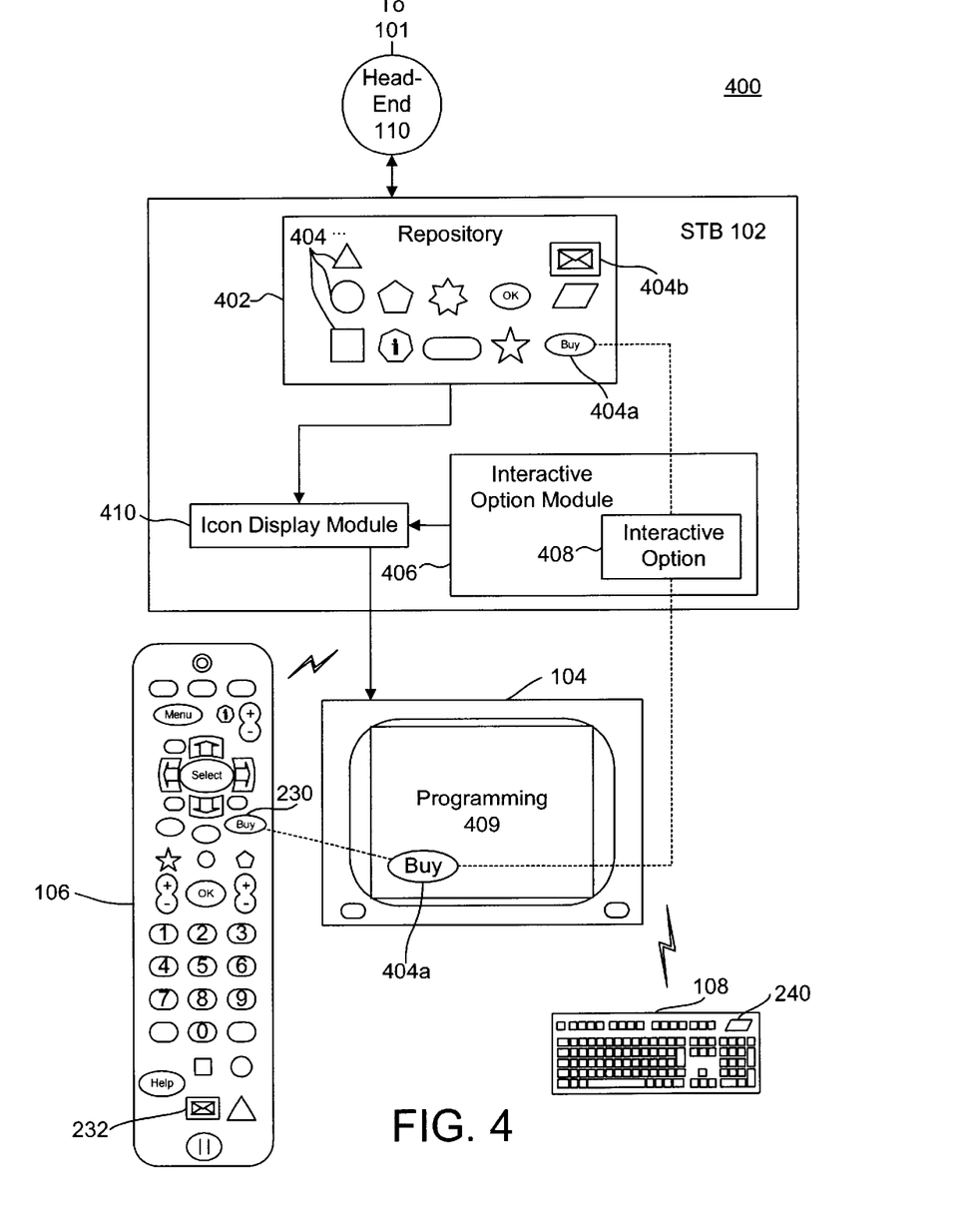
FIG. 4 is a logical block diagram of a system for providing a context-sensitive instructional user interface icon in an interactive television system according to an embodiment of the invention.

FIG. 4 is a logical block diagram of a system 400 for providing a context-sensitive instructional user interface icon in an interactive television system 200 that resolves the above-described problems and disadvantages of conventional approaches. As explained more fully hereafter, the depicted system 400 provides an intuitive mechanism for instructing a user as to which button of a remote control 106 will activate an available interactive option. The depicted logical components may be implemented using one or more of the physical components shown in FIG. 3. Additionally, or in the alternative, various logical components may be implemented as software modules stored in the memory 306 and/or storage device 310 and executed by the CPU 312.

In one embodiment, the system 400 includes an icon repository 402 for storing a plurality of icons 404. An icon is a small picture that typically represents an object or program within a GUI.

In the context of the following description, an icon 404 represents a button on the remote control 106 and shares one or more visual characteristics with the button it represents. For example, the icon 404 may have the same shape as the corresponding button. Likewise, the icon 404 may be the same color. Furthermore, the icon 404 and the corresponding button may share similar graphical or textual markings. For example, as shown in FIG. 4, a graphical marking resembling an envelope may be used on an icon 404b corresponding to the e-mail button 232.

In one embodiment, the icon 404 and the corresponding button may share multiple visual characteristics, such as both shape and color, or shape and graphical markings. The correlation of multiple visual characteristics can be a powerful visual cue to a user in locating the correct button on the remote control 106.

Icons 404 in the repository 402 may be stored in various standard formats, such as bitmaps, JPEG (Joint Photographic Experts Group) images, GIF (Graphic Interchange Format) images, TIFF (Tagged Interchange File Format) images, etc. The icon repository 402 may be implemented using any suitable data structure, such as an array, linked list, stack, queue, disk file, or the like. The data structure implementing the icon repository 402 may be stored in the memory 306 or the storage device 310. The icon repository 402 may include an index (not shown) to provide faster storage and retrieval of icons 404 within the icon repository 402.

In one embodiment, one or more icons 404 may correspond to particular interactive options 408 that may become periodically available during the presentation of television programming 409 or other forms of content (such as Web pages, user interfaces, or the like) on the television 104. The interactive option 408 may be facilitated by one or more interactive option modules 406 configured to provide the appropriate functionality.

In one configuration, an interactive option module 406 detects the availability of the interactive option 408. This may be accomplished, in one embodiment, by detecting a trigger received with the television programming 409. For example, the interactive option module 406 may detect an ATVEF trigger containing a link to an advertiser's site.

The system 400 may also include an icon display module 410, which is in communication with the interactive option module 406. After the interactive option module 406 detects that the interactive option 408 is available, the icon display module 410 instructs the user as to which button of the remote control 106 should be pressed to activate the option 408. In one configuration, the icon display module 410 retrieves an icon 404 corresponding to the option 408 from the icon repository 402 and displays the icon 404 on the television 104 (or other display device).

The icon 404 may be superimposed over the displayed programming 409 using a semitransparent graphical overlay. This prevents the icon 404 from obscuring the programming 409. The icon display module 410 may include or be in communication with the A/V controller 308 of FIG. 3 in order to combine the display of the icon 404 with the programming 409 using conventional techniques.

Displaying the icon 404 both notifies the user as to the availability of the interactive option 408 and instructs the user as to the appearance (and possibly the location) of the corresponding button on the remote control 106. Hence, the icon 404 is sometimes referred to herein as an "instructional" icon for a user interface.

As an example, suppose the programming 409 includes a cable shopping program, such as QVC®. When a particular product is displayed, the programming 409 may include a trigger for an interactive option 408 enabling a user to purchase the displayed product by pressing the "Buy" button 230.

In one implementation, the icon display module 410 retrieves the icon 404a from the icon repository 402 corresponding to the "Buy" button 230. Thereafter, the icon display module 410 displays the icon 404a on the television 104. Broken lines in FIG. 4 indicate the relationship between the "Buy" button 230, the interactive option 408, and the icon 404a.

As shown in FIG. 4, the icon 404a has the same shape as the "Buy" button 230, i.e. a squashed oval. Moreover, both the icon 404a and the "Buy" button 230 include similar textual markings, i.e. the word "Buy." The similarity of the shape and textual markings of the icon 404a may assist the user in rapidly locating the "Buy" button 230 within the remote control 106.

While the icon repository 402, the icon display module 410, the interactive option module 406, and the interactive option 408 are illustrated as components of the STB 102, those skilled in the art will recognize that these components may be located within various physical locations within the system 100. For example, a single icon repository may be implemented within a head-end 110 and provide icons 404 to a plurality of STBs 102.

Figure 5:
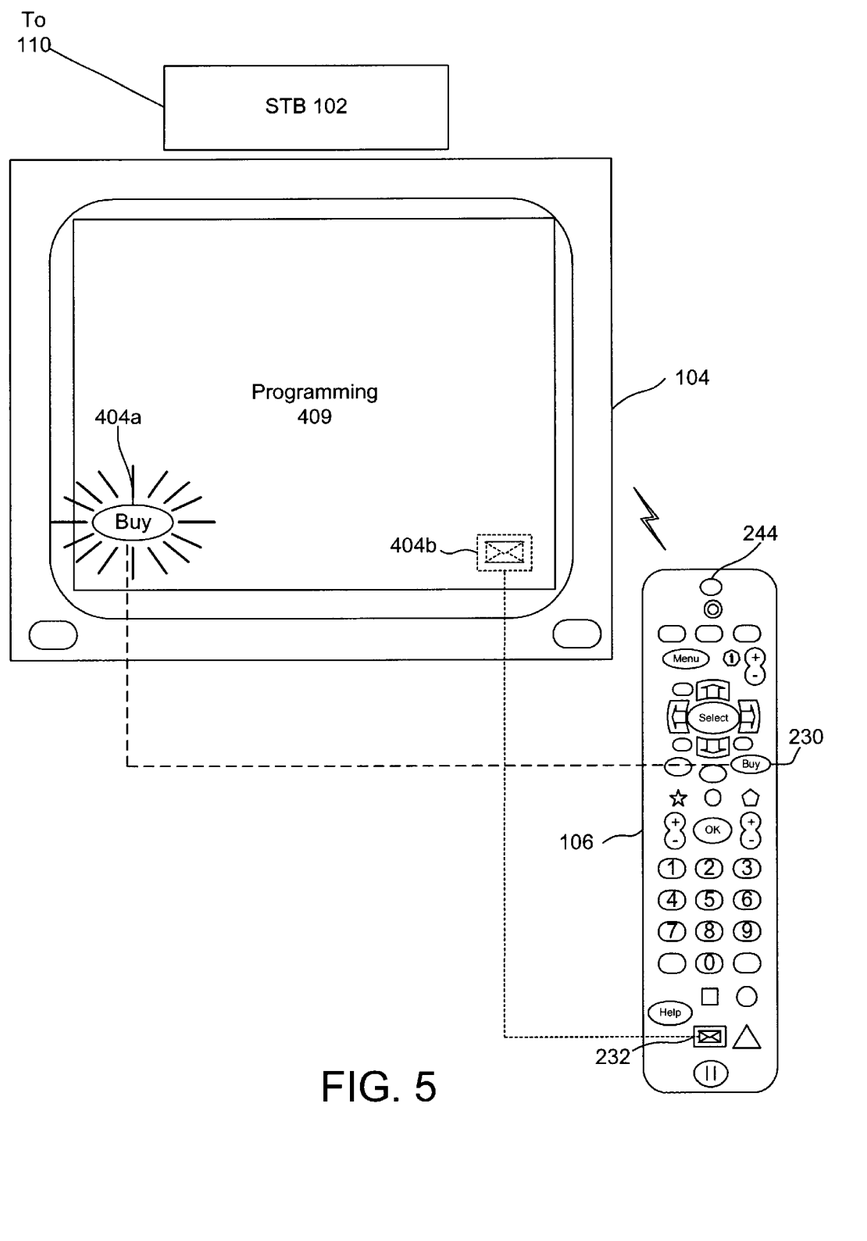
FIG. 5 illustrates an instructional user interface icon being displayed in response to the availability of a corresponding interactive option.

In one embodiment, the icon display module 410 is configured to visually emphasize a displayed icon 404 in order to attract a user's attention. As shown in FIG. 5, the icon 404a may be visually emphasized by highlighting, illuminating, pulsing, or otherwise emphasizing the icon 404a relative to other icons 404 being displayed. This may be accomplished, for example, by cycling the colors of the icon 404a, changing the color of the display screen behind the icon 404a, or other similar techniques.

As also shown in FIG. 5, the displayed icon 404a is preferably larger than the corresponding button of the remote control 106. This may be helpful to users who have impaired vision. Typically, at least some enlargement of the icon 404a is necessary, since the low resolution of a television screen makes small text and graphics difficult to display.

As also depicted in FIG. 5, the display component 410 may be further configured to erase a displayed icon 404. The interactive option module 406 may recognize, for instance, that the interactive option 408 is no longer available. Accordingly, the interactive option module 406 may then cause the icon display module 410 to erase the displayed icon 404.

An interactive option 408 may become unavailable for many reasons, such as a change of television channels, the completion of an advertisement, or the like. For example, in a QVC®-type program, items must typically be purchased within a particular time period. Moreover, the available supply of an item may be exhausted. In one embodiment, if either the time period for purchase expires or the available supply is exhausted, the icon 404 corresponding to the interactive option 408 may be removed.

Of course, the icon 404 may also be removed in response to a user activating the corresponding interactive option 408. For example, in response to a user selecting an e-mail button 232 to check his or her e-mail, the icon 404b corresponding to the e-mail button 232 may be erased, as depicted in FIG. 5.

In one embodiment, when the user activates the button corresponding to a displayed icon 404, the system 200 produces an audible confirmation. The audible confirmation may be used to assure the user that the correct button was pressed on the remote control 106. The A/V controller 308 of FIG. 3 may be configured to produce an audio signal when the correct button is activated. The audio signal may include, for example, a chime, a tone, a beep, or other suitable indicator. In one embodiment, the audio signal may include a spoken name of the button, which may be generated using conventional voice synthesis techniques.

Figure 6:
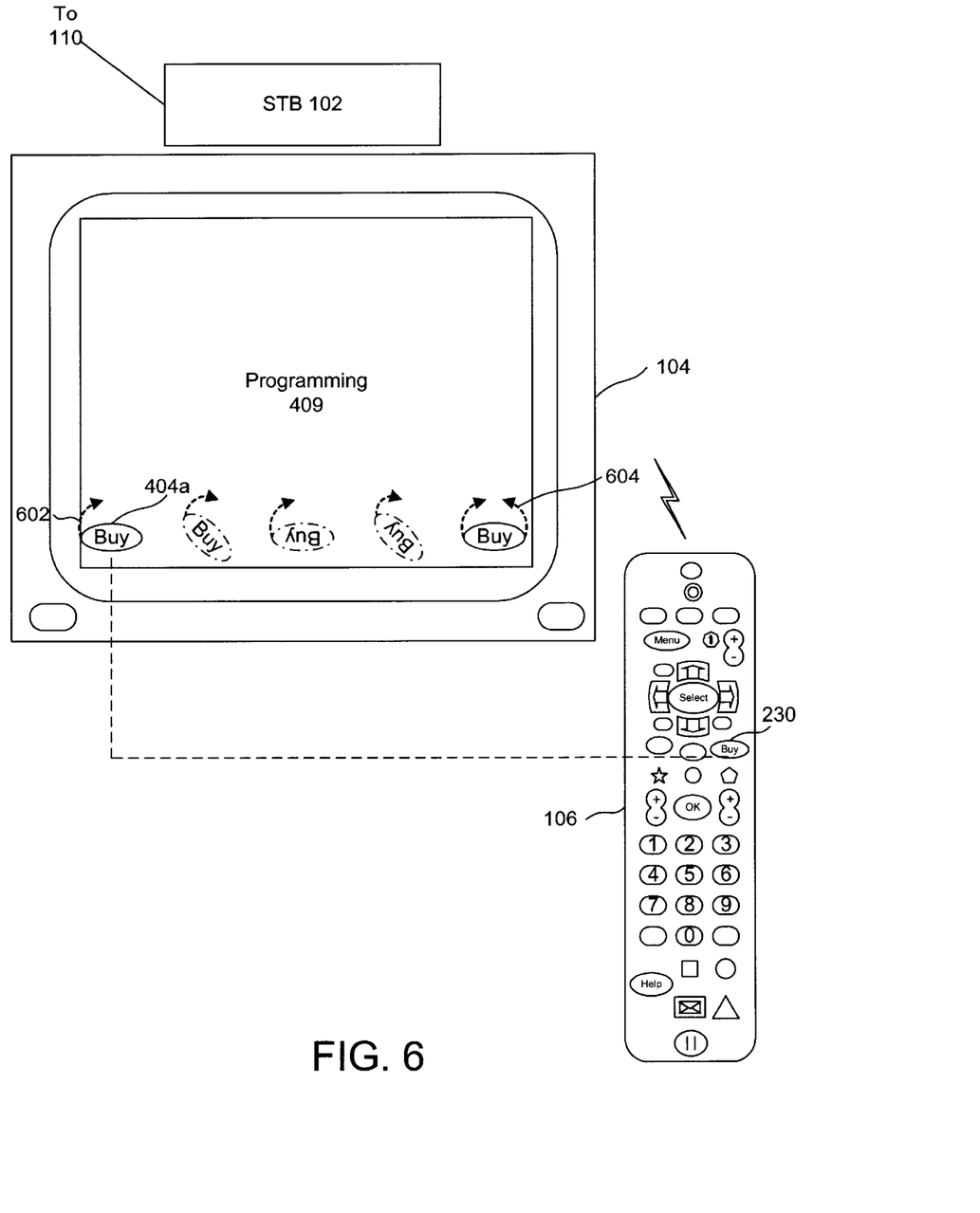
FIG. 6 illustrates an instructional user interface icon being animated.

FIG. 6 illustrates an alternative embodiment of the invention in which an icon 404 is visually emphasized using animation techniques. For example, a icon 404 may be rotated, translated, and/or scaled to capture the attention of the user.

In the depicted example, an icon 404a may be initially displayed in the bottom left-hand corner of the television 104. The arrow 602 indicates a direction (clockwise) in which the icon 404a may then be rotated as the icon 404a moves from left to right across the bottom of the screen. Once the icon 404a has reached the bottom right-hand corner, the arrow 604 indicates the direction (counterclockwise) that the icon 404a may rotate as it moves from right to left. Of course, the illustrated animation is merely exemplary, and many other techniques for animation may be used.

Figure 7:
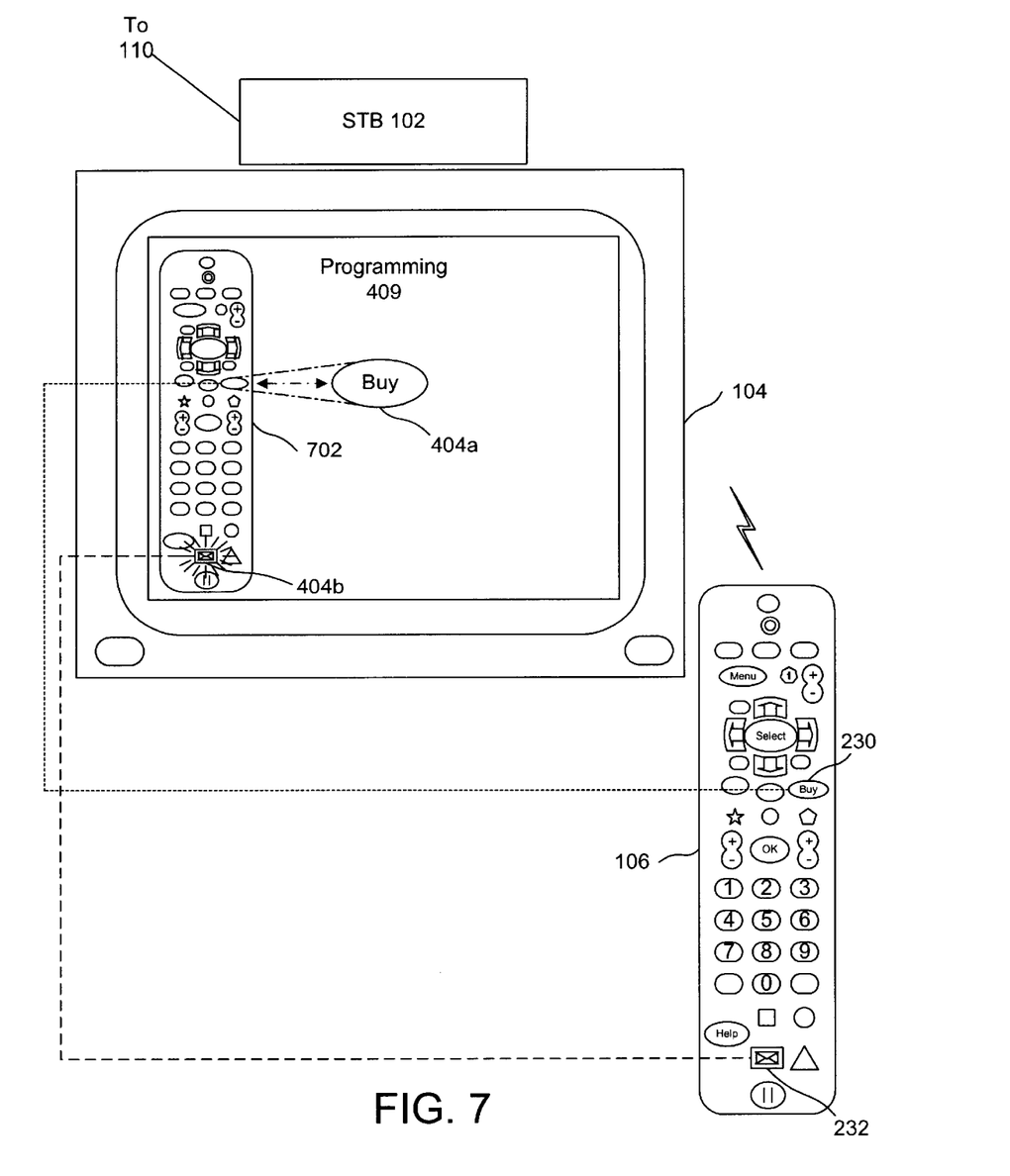
FIG. 7 illustrates an instructional user interface icon being animated in the context of a map of a remote control.

FIG. 7 illustrates an embodiment of the invention in which a map 702 of the remote control 106 (or a portion thereof) is displayed. As described in more detail below, the map 702 further assists a user in locating a button corresponding to an available interactive option 408.

The map 702 may include a plurality of icons 404 from the repository 402, which are arranged according to the relative locations of the corresponding buttons on the remote control 106. The map 702 may include other graphical elements, such as a semitransparent outline of a remote control to provide a context for the displayed icons 404. In addition, the map 702 may contain icons 404 corresponding to buttons that are not used for interactive options 408, such as, for example, the power button 206. In one embodiment, the map 702 is displayed by the icon display module 410.

Preferably, an icon 404 in the map 702 corresponding to a currently available interactive option 408 is visually emphasized through highlighting, animation, scaling, or the like. For example, as shown in FIG. 7, the icon 404a corresponding to the "Buy" button 230 may be cyclically scaled (e.g., enlarged and reduced) in an animated fashion to attract the user's attention. Likewise, as depicted in FIG. 7, the icon 404b corresponding to the e-mail button 232 may be illuminated, pulsed, or similarly highlighted.

A map 702 may also provide a "relative size" visual characteristic for relating an icon 404 to a button of the remote control 106. The size of each icon 404 within the map 702 is preferably relative to the size of the corresponding button. Thus, to locate a button of the remote control 106, a user may compare the size of a displayed icon 404 corresponding to an available interactive option 408 with the sizes of other icons 404 in the map 702.

Of course, the map 702 need not correspond to the entire remote control 106. For example, the map 702 may represent only the "top" or "bottom" halves of the remote control 106, or some other portion thereof.

Figure 8:
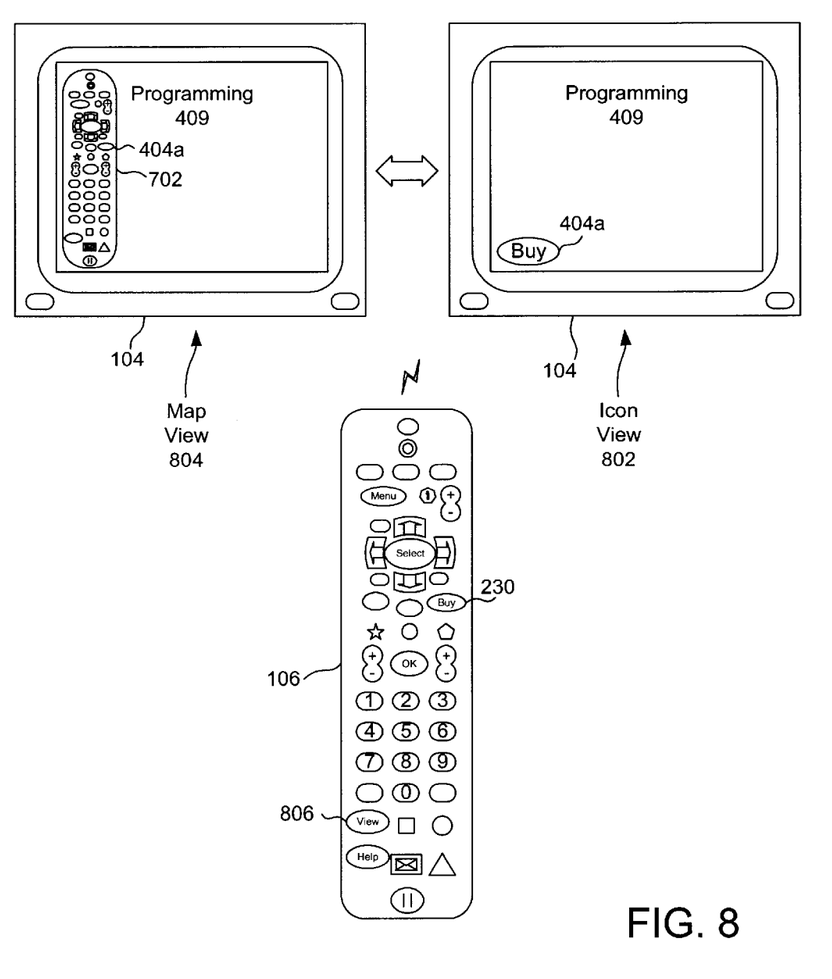
FIG. 8 illustrates a user-selectable map view and icon view.

In one embodiment, as shown in FIG. 8, a user may switch between an icon view 802 and a map view 804. The icon view 802 may correspond to the embodiment shown in FIGS. 4–6 in which an icon 404 representing an available interactive option 408 is displayed. The map view 804 may correspond to the embodiment depicted in FIG. 7 in which a map 702 is displayed.

In one embodiment, the icon view 802 may be the default view, with the map view 804 being displayed only in response to a user pressing an appropriate button on the remote control 106, such as a "View" button 806. Alternatively, the map view 804 may be the default view. The "View" button 806 may be configured to toggle the display between the icon view 802 and the map view 804 in various embodiments.

Figure 9:
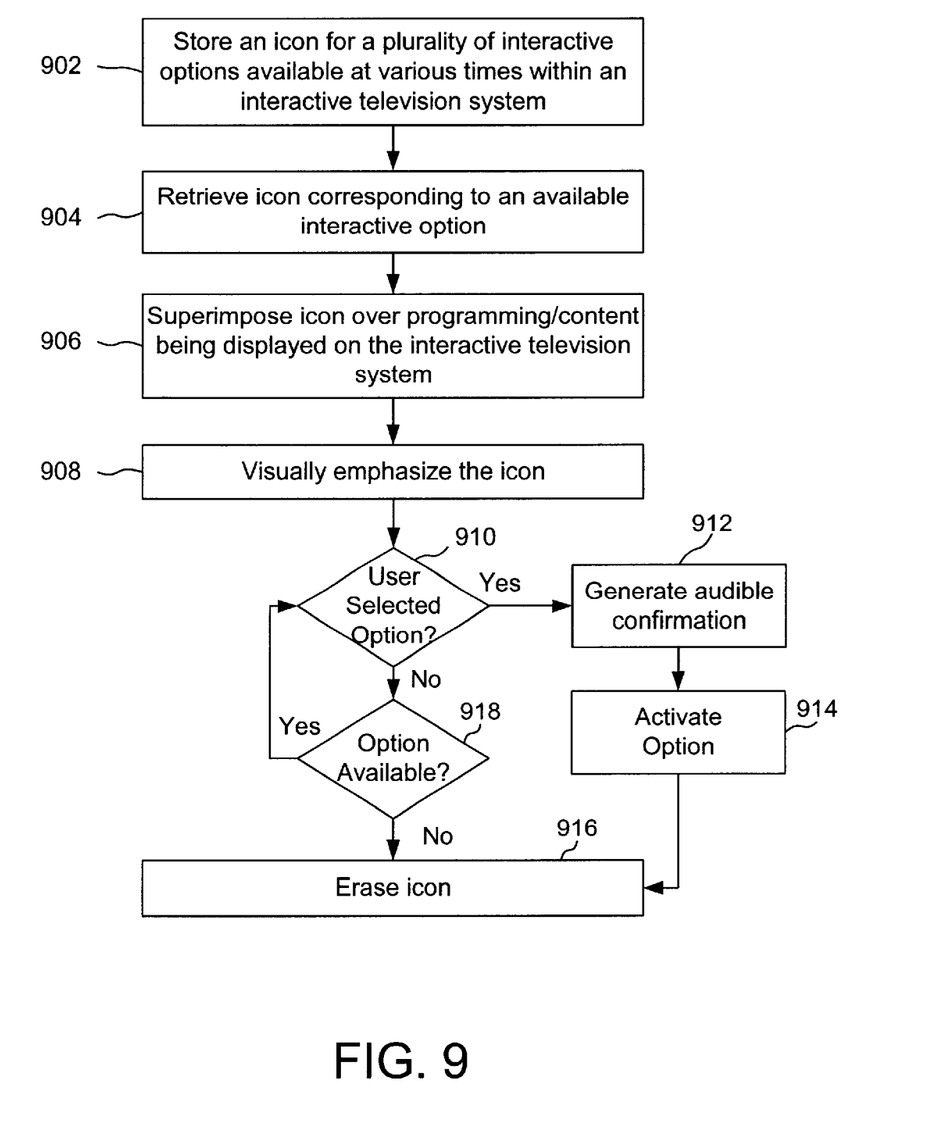
FIG. 9 is a flowchart of a method for providing a context-sensitive instructional user interface icon in an interactive television system.

Referring now to FIG. 9, there is shown a flowchart of a method 900 for providing a context-sensitive instructional user interface icon in an interactive television system 200. The method 900 begins by storing 902 in a repository 402 an icon 404 for each of a plurality of interactive options 408 periodically available within an interactive television system 200.

When an interactive option 408 becomes available, an icon 404 corresponding to the interactive option 408 is retrieved 904. Thereafter, the icon 404 is superimposed 906, in one embodiment, over currently-displayed programming 409 or other displayed content. As noted previously, a user may switch between a map view 804 and an icon view 802 of the icon 404 by pressing an appropriate button, such as a "View" button 806.

In certain configurations, the icon 404 is visually emphasized 908 to bring the icon 404 to the user's attention. Various types of visual emphasis are contemplated, such as highlighting, animation, scaling, etc.

A determination 910 is then made as to whether the user has selected the available interactive option 408 using the remote control 106. If so, an audible confirmation is generated 912 to alert the user to the fact that the correct button was pressed. The interactive option 408 is then activated 914 using conventional techniques, after which the icon 404 is erased 916 from the television 104.

If, however, the user has not selected the available interactive option 408, a determination 918 is made as to whether the option 408 is still available. If so, the method 900 returns to step 910 to wait for the user to select the option 408. If the option 408 is no longer available, the icon 404 corresponding to the option 408 is erased 916.

Based upon the foregoing, the present invention offers numerous advantages not available in conventional interactive television systems. In response to an interactive option becoming available, an instructional user interface icon is displayed to assist a user in identifying and/or locating a corresponding button on the remote control. Each icon shares a common visual characteristic with a corresponding button, such as shape, color, text markings, graphical markings, size, relative position, and the like. Accordingly, the user is not required to read a printed manual or an on-line help screen to make use of an interactive option.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for assisting a user in activating an interactive option within an interactive television system, the method comprising:

storing an icon for each of a plurality of interactive options periodically available within the interactive television system, each interactive option corresponding to a button on a remote control, each icon sharing a common visual characteristic with a corresponding button on the remote control;

displaying a first icon in response to an interactive option corresponding to the first icon becoming available; and displaying a map of the remote control including the first icon, wherein the map comprises a plurality of icons representing buttons, each icon having a same relative location as a corresponding button on the remote control.

2. The method of claim 1, wherein a shared visual characteristic comprises a color.

3. The method of claim 1, wherein a shared visual characteristic comprises a shape.

4. The method of claim 1, wherein a shared visual characteristic comprises text markings.

5. The method of claim 1, wherein a shared visual characteristic comprises graphical markings.

6. The method of claim 1, wherein at least one icon shares a plurality of common visual characteristics with a corresponding button on the remote control.

7. The method of claim 1, wherein the common visual characteristic comprises a location of the first icon within the map relative to a location of the corresponding button on the remote control.

8. The method of claim 1, wherein the common visual characteristic comprises a size of the first icon within the map relative to sizes of the plurality of icons and the corresponding buttons on the remote control.

9. The method of claim 1, further comprising:

switching between a view of the first icon and a view of the map in response to activation of a specifically-designated button on the remote control.

10. The method of claim 1, further comprising:

visually emphasizing the first icon.

11. The method of claim 10, wherein visually emphasizing comprises highlighting the first icon.

12. The method of claim 10, wherein visually emphasizing comprises animating the first icon.

13. The method of claim 10, wherein visually emphasizing comprises enlarging the first icon relative to the plurality of icons.

14. The method of claim 1, wherein displaying comprises:

superimposing the first icon over content being displayed by the interactive television system.

15. The method of claim 14, wherein the content comprises a video program.

16. The method of claim 14, wherein the content comprises a graphical user interface.

17. The method of claim 14, wherein the first icon is superimposed over the content using a semitransparent graphical overlay.

18. The method of claim 1, further comprising:
erasing the first icon in response to a user activating the corresponding button.

19. The method of claim 1, further comprising:
erasing the first icon in response to the interactive option being no longer available.

20. The method of claim 1, further comprising:
producing an audible confirmation in response to a user activating the corresponding button.

21. A system for assisting a user in activating an interactive option within an interactive television system, the system comprising:
an icon repository configured to store an icon for each of a plurality of interactive options periodically available within the interactive television system, each interactive option corresponding to a button on a remote control, each icon sharing a common visual characteristic with a corresponding button on the remote control; and
an icon display component configured to display a first icon in response to an interactive option corresponding to the first icon becoming available, wherein the icon display component is further configured to display a map of the remote control including the first icon, wherein the map comprises a plurality of icons representing buttons, each icon having a same relative location as a corresponding button on the remote control.

22. The system of claim 21, wherein a shared visual characteristic comprises a color.

23. The system of claim 21, wherein a shared visual characteristic comprises a shape.

24. The system of claim 21, wherein a shared visual characteristic comprises text markings.

25. The system of claim 21, wherein a shared visual characteristic comprises graphical markings.

26. The system of claim 21, wherein at least one icon shares a plurality of common visual characteristics with a corresponding button on the remote control.

27. The system of claim 21, wherein the common visual characteristic comprises a location of the first icon within the map relative to a location of the corresponding button on the remote control.

28. The system of claim 21, wherein the common visual characteristic comprises a size of the first icon within the map relative to sizes of the plurality of icons and corresponding buttons.

29. The system of claim 21, wherein the icon display component is further configured to switch between a view of the first icon and a view of the map in response to activation of a specifically-designated button on the remote control.

30. The system of claim 21, wherein the icon display component is further configured to visually emphasize the first icon relative to the plurality of icons.

31. The system of claim 30, wherein the icon display component is further configured to highlight the first icon.

32. The system of claim 30, wherein the icon display component is further configured to animate the first icon.

33. The system of claim 30, wherein the icon display component is further configured to visually emphasize the first icon by enlarging the first icon relative to the plurality of icons.

34. The system of claim 21, wherein the icon display component is further configured to superimpose the first icon over content being displayed.

35. The system of claim 34, wherein the content comprises a video program.

36. The system of claim 34, wherein the content comprises a graphical user interface.

37. The system of claim 34, wherein the icon display component is further configured to superimpose the first icon over the content using a semitransparent graphical overlay.

38. The system of claim 21, wherein the icon display component is further configured to erase the first icon in response to a user activating the corresponding button.

39. The system of claim 21, wherein the icon display component is further configured to erase the first icon in response to the interactive option being no longer available.

40. The system of claim 21, further comprising:
an audio component configured to produce an audible confirmation in response to a user activating the corresponding button.

41. A method for assisting a user in activating an interactive option within an interactive television system, the method comprising:
storing a first icon representing a first interactive option, the first icon having substantially the same shape as a first button on a remote control for the interactive television system;
storing a second icon representing a second interactive option, the second icon having substantially the same shape a second button on the remote control, wherein the shape of the first button is different from the shape of the second button; and
displaying the first icon on a display device in response to the first interactive option becoming available within the interactive television system.

42. The method of claim 41, further comprising:
displaying the second icon on the display device in response to the second interactive option becoming available.

43. The method of claim 42, further comprising:
displaying a map of the remote control including the first icon, wherein the map comprises a plurality of icons representing buttons, each icon having a same relative location as a corresponding button on the remote control.

44. A system for assisting a user in activating an interactive option within an interactive television system, the method comprising:
an icon repository to store a first icon representing a first interactive option and a second icon representing a second interactive option, the first icon having substantially the same shape as a first button on a remote control for the interactive television system, and the second icon having substantially the same shape a second button on the remote control, wherein the shape of the first button is different from the shape of the second button; and
an icon display component to display the first icon on a display device in response to the first interactive option becoming available within the interactive television system.

45. The system of claim 44, wherein the icon display component is to display the second icon on the display device in response to the second interactive option becoming available within the interactive television system.

46. The system of claim 44, wherein the icon display component is to display a map of the remote control including the first icon, wherein the map comprises a plurality of icons representing buttons, each icon having a same relative location as a corresponding button on the remote control.

* * * * *

UNITED STATES PATENT AND TRADEMARK OFFICE
CERTIFICATE OF CORRECTION

PATENT NO. : 6,762,773 B2
DATED : July 13, 2004
INVENTOR(S) : Hubert E. Kolde and Anthony F. Istvan It is certified that error appears in the above-identified patent and that said Letters Patent is hereby corrected as shown below:

<u>Title page,</u>
Item [56], References Cited, U.S. PATENT DOCUMENTS, insert
-- 6,240,555 B1    5/2001     Shoff et al.
   5,880,768      3/1999     Lemmons et al.
   5,818,440      10/1998    Allibhoy et al. --

Signed and Sealed this

Twelfth Day of October, 2004

JON W. DUDAS
*Director of the United States Patent and Trademark Office*